(12) United States Patent
Nakatani et al.

(10) Patent No.: US 7,426,114 B2
(45) Date of Patent: Sep. 16, 2008

(54) ELECTRONIC APPARATUS

(75) Inventors: Masato Nakatani, Kawaguchi (JP);
Yasuyuki Suzuki, Tachikawa (JP);
Yosuke Miura, Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 121 days.

(21) Appl. No.: 11/607,275

(22) Filed: Nov. 30, 2006

(65) Prior Publication Data

US 2007/0165386 A1 Jul. 19, 2007

(30) Foreign Application Priority Data

Jan. 13, 2006 (JP) .............................. 2006-006227

(51) Int. Cl.
*H05K 5/00* (2006.01)
(52) U.S. Cl. ...................... 361/752; 361/801; 361/759; 361/732; 361/726; 361/740; 361/747
(58) Field of Classification Search ................ 361/752, 361/759, 732, 726, 740, 801
See application file for complete search history.

(56) References Cited

U.S. PATENT DOCUMENTS 5,455,746 A * 10/1995 Sato et al. ................... 361/816
5,497,296 A * 3/1996 Satou et al. .................. 361/681
5,504,648 A * 4/1996 Honda et al. ................. 361/686
6,661,650 B2 * 12/2003 Nakajima et al. ........... 361/683
6,809,933 B2 10/2004 Kuchiishi et al.
6,826,040 B2 * 11/2004 Wang .......................... 361/681
2006/0067035 A1 * 3/2006 Hamada et al. ............. 361/680

FOREIGN PATENT DOCUMENTS

JP 2000-305658 11/2000
JP 2001-166849 6/2001

* cited by examiner

*Primary Examiner*—Jeremy C. Norris
*Assistant Examiner*—Andargie M Aychillhum
(74) *Attorney, Agent, or Firm*—Blakely, Sokoloff, Taylor & Zafman LLP

(57) ABSTRACT

According to one embodiment, an electronic apparatus includes a main body, a display panel, and a hinge. The main body includes a housing having a main wall and a first engaging portion placed inside the housing. A space portion is created between the first engaging portion and a plane defined by an inner surface of the main wall. The hinge includes a first fixing member fixed to the housing, a second fixing member fixed to the display panel, and a connection member which rotatably connects the second fixing member to the first fixing member. The first fixing member has a base located opposite the main wall with respect to the first engaging portion and a second engaging portion which is to be inserted into the space portion to engage with the first engaging portion.

6 Claims, 9 Drawing Sheets

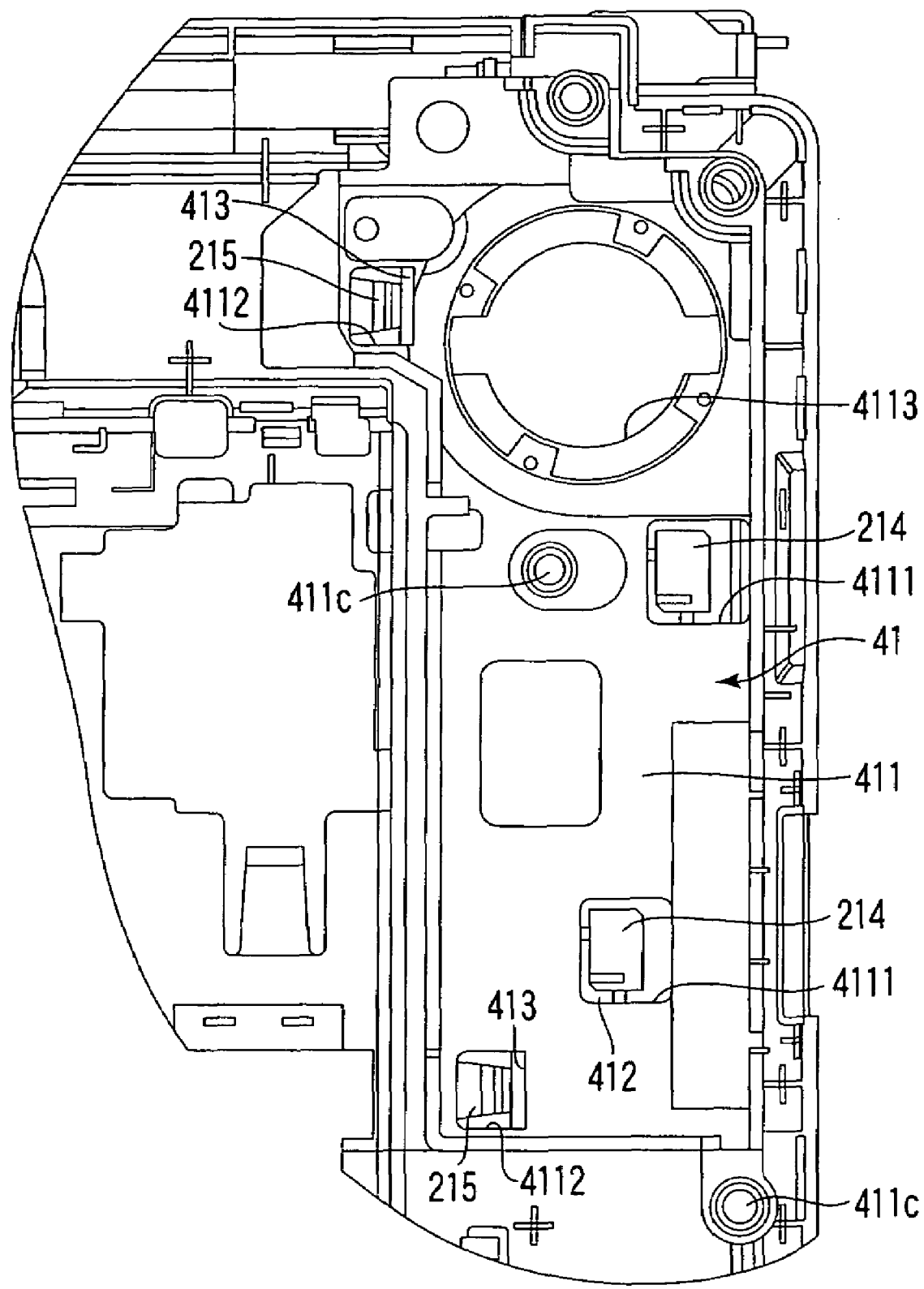
F I G. 5

F8-F8

ELECTRONIC APPARATUS

CROSS-REFERENCE TO RELATED APPLICATIONS

This application is based upon and claims the benefit of priority from Japanese Patent Application No. 2006-006227, filed Jan. 13, 2006, the entire contents of which are incorporated herein by reference.

BACKGROUND

1. Field

The present invention relates to an electronic apparatus such as a notebook personal computer, and in particular, to an electronic apparatus in which a housing and a display panel are connected together by hinges.

2. Description of the Related Art

A notebook personal computer has a housing and a display panel. The display panel is rotatably connected to the housing by hinges. Each of the hinges comprises a first fixing member fixed to the housing, a second fixing member fixed to the display panel, and a connection member that rotatably connects the first and second fixing member together.

In conventional notebook personal computers, screws are used to fix the first fixing member to the housing. This rigidly fixes the first fixing member to the housing to allow the display panel to rotatably move stably with respect to the housing.

A technique for fixing the hinge to the housing utilizes a key-like projection formed on a fixing member connected to the hinge. After being inserted into a notch portion formed in the housing, the projection is slid and engages with an edge of the notch portion, formed in the housing. This fixes the hinges to the housing (see, for example, Jpn. Pat. Appln. KOKAI Publication No. 2000-305658).

To fix the first fixing member to the housing by screws, it is necessary to accurately associate the position of the housing with the position of the first fixing member. This may increase the time required to position the housing and first fixing member, thus reducing the efficiency of assembly of the electronic apparatus.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 5 is an exemplary bottom view of the upper housing to which the hinge is fixed according to the embodiment of the present invention;

DETAILED DESCRIPTION

Various embodiments according to the invention will be described hereinafter with reference to the accompanying drawings. In general, according to one embodiment of the invention, an electronic apparatus includes a main body, a display panel, and a hinge. The main body includes a housing having a main wall and a first engaging portion placed inside the housing. A space portion is created between the first engaging portion and a plane defined by an inner surface of the main wall. The hinge connects the display panel to the main body. The hinge includes a first fixing member fixed to the housing, a second fixing member fixed to the display panel, and a connection member which rotatably connects the second fixing member to the first fixing member. The first fixing member has a base located opposite the main wall with respect to the first engaging portion and a second engaging portion which is inserted into the space portion to engage with the first engaging portion.

Figure 1:
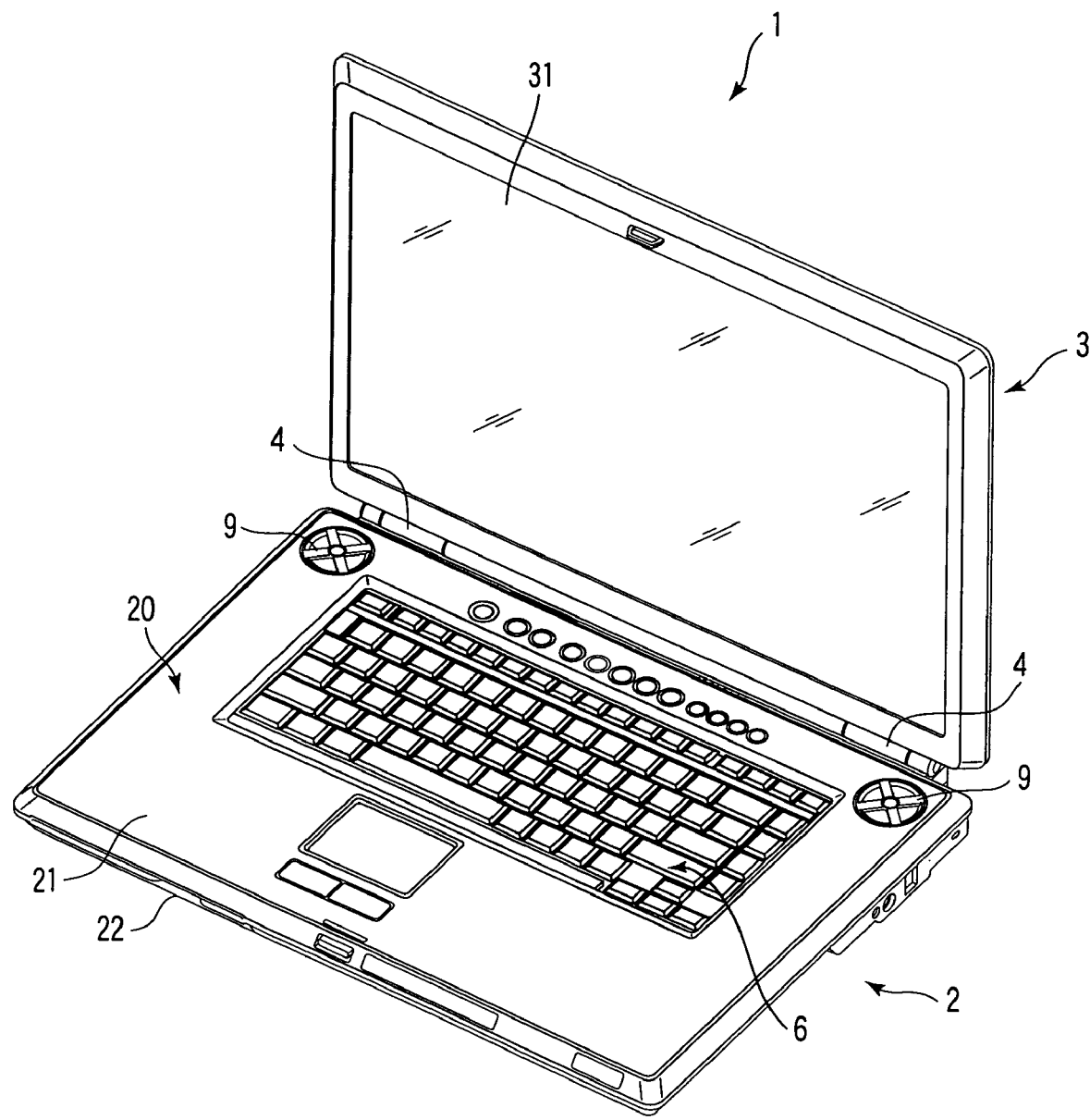
FIG. 1 is a perspective view of an exemplary electronic apparatus according to an embodiment of the present invention.

With reference to FIGS. 1 to 9, description will be given of an electronic apparatus 1 according to an embodiment of the present invention. FIG. 1 is a perspective view of the electronic apparatus 1 according to the embodiment of the present invention. The electronic apparatus 1 shown in FIG. 1 is a notebook portable computer.

The electronic apparatus 1 comprises a main body 2 and a display panel 3. The display panel 3 is connected to the main body 2 by two hinges 4 arranged in the rear of the main body 2, which is farther from a user; one of the two hinges is placed on the right of the apparatus, while the other is placed on the left, with respect to the user.

The main body 2 comprises a housing 20 composed of an upper and lower housings 21 and 22 located above and below, respectively, when the electronic apparatus 1 is placed on a table or the like. A circuit board, a fan, a speaker unit, mass storage, a communication module, and the like are arranged inside the housing 20. A keyboard 6 and the like are arranged on the housing 20.

The display panel 3 can be rotatably moved, by the two hinges 4 arranged on the housing 20, between a closed state in which it overlaps the main body 2 and an open state in which it stands upright on the main body 2. The display panel 3 incorporates a display and exposes a display surface 31 to the user in the open state. The hinges 4 offer a rotation movement resistance sufficient to hold the display panel 3 at an arbitrary angle to the main body 2.

The configuration of essential part of the electronic apparatus 1 will be described below. However, since the electronic apparatus 1 has an almost laterally symmetrical structure, the description below is limited to the structure of left side of the apparatus. In other words, it should be appreciated that the structure of right side of the electronic apparatus 1 corresponds to the lateral inversion of the structure of the left side, described below.

(Configuration of the Upper Housing 21)

Figure 2:
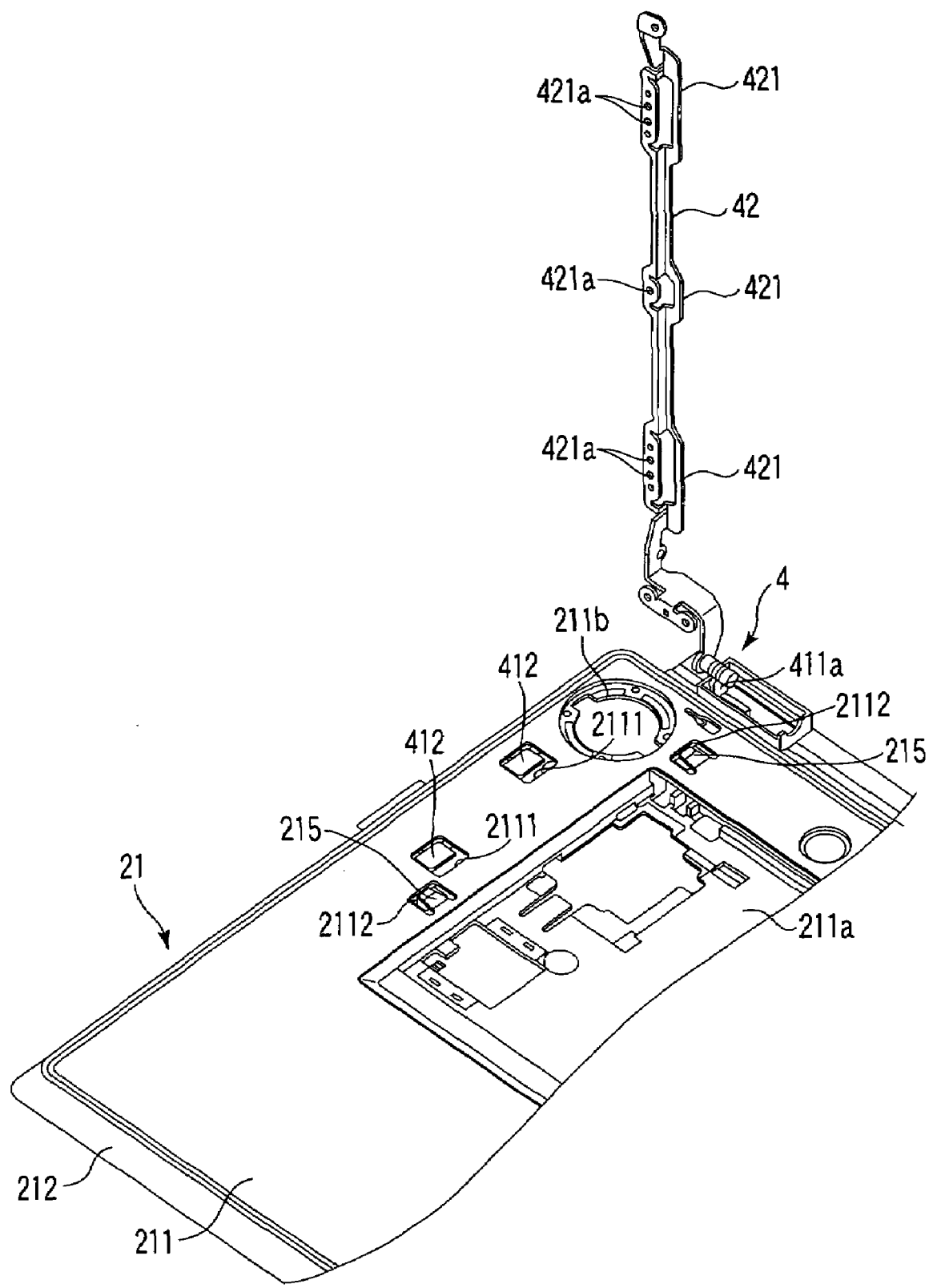
FIG. 2 is an exemplary perspective view of an upper housing to which hinge is fixed according to the embodiment of the present invention, the upper housing being viewed from above.
Figure 3:
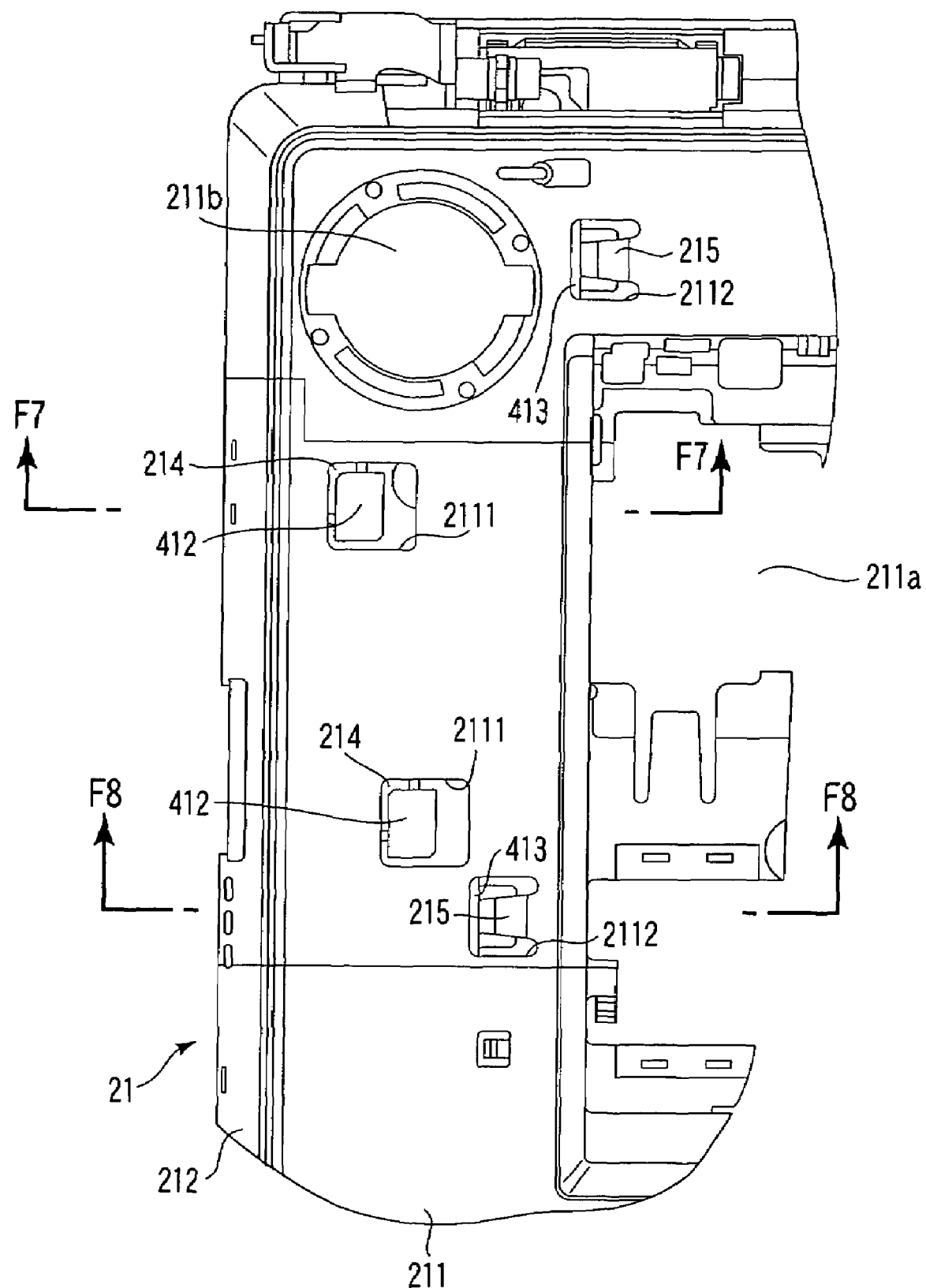
FIG. 3 is an exemplary top view of the upper housing to which the hinge is fixed according to the embodiment of the present invention.

FIG. 2 is a perspective view of the upper housing 21 to which the hinge 4 is fixed according to the embodiment of the present invention, the upper housing 21 being viewed from above. FIG. 3 is a top view of the upper housing 21 to which the hinge 4 is fixed according to the embodiment of the present invention. A decorative panel has been removed from the upper housing 21 shown in FIGS. 2 and 3.

As shown in FIGS. 2 and 3, the upper housing 21 comprises a housing upper wall (main wall) 211, a housing side wall 212, two bosses 213 (see FIG. 7), two housing engaging portions (first engaging portion) 214, and two housing stoppers (first projecting member) 215.

A keyboard opening 211a is formed in a central area of the housing upper wall 211. The above keyboard 6 is placed in the keyboard opening 211a. A housing speaker opening 211b is formed in a left corner of the housing upper wall 211 behind the keyboard opening 211a. A speaker panel 9 is fitted into the housing speaker opening 211b. The housing upper wall 211 comprises two first housing openings 2111 and two second housing openings 2112 all of which are located on the left of the keyboard opening 211a.

The housing side wall 212 extends downward from the outer periphery of the housing upper wall 211 and is connected to the lower housing 22 at its lower end. The two bosses 213 are placed at the respective positions of the upper housing 21. Each of the bosses 213 is integrated with the upper housing 21 and projects downward from the inner surface of the housing upper wall 211. Self-tapping screws (see FIG. 7) are threaded into the respective bosses 213 along their axes. Each of the self-tapping screws 7 fixes a first fixing member 41 to the upper housing 21.

Figure 9:
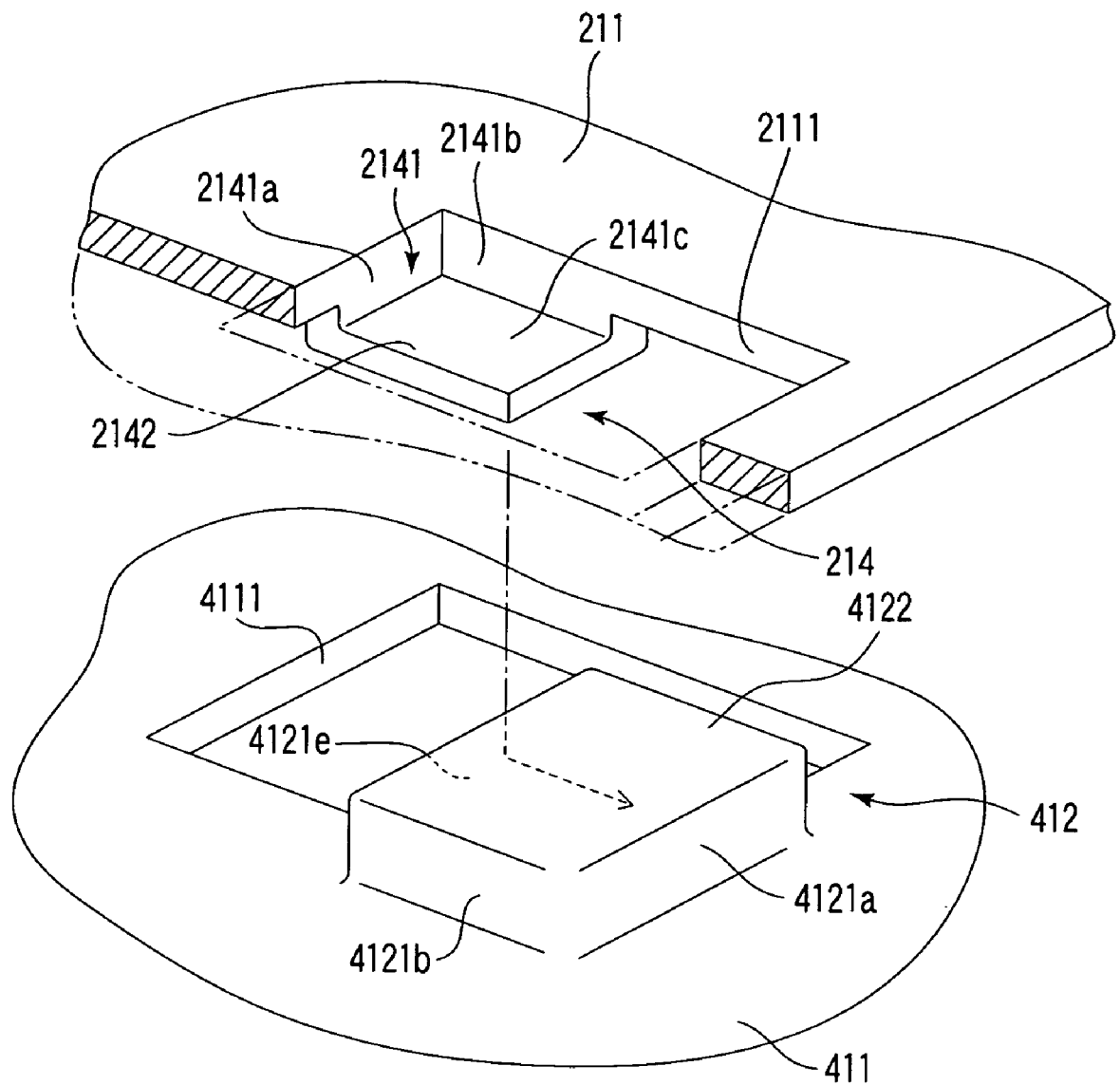
FIG. 9 is an exemplary perspective view of a housing engaging portion and a hinge engaging portion according to the embodiment of the present invention.

As shown in FIG. 9, each of the housing engaging portions 214 is placed at a position corresponding to the first housing opening 2111. Each of the housing engaging portions 214 is composed of a wall portion 2141 that projects downward from the housing upper wall 211 and an engaging plate 2142 that extends from a lower end of the wall portion 2141 and parallel to the housing upper wall 211.

The wall portion 2141 comprises a first wall portion 2141a and a second wall portion 2141b. The first wall portion 2141a is formed on the left of the first housing opening 2111 and along a front-to-back direction. The second wall portion 2141b is formed behind the first housing opening 2111 and along a lateral direction.

The engaging plate 2142 is rectangular and partly covers the first housing opening 2111. This forms a first space portion (space portion) 2141c between the engaging plate 2142 and a plane defined by an inner surface of the housing upper wall 211; the first space portion 2141c corresponds to the height of the wall portion 2141. The first space portion 2141c is open in its sides corresponding to the right and front of the first housing opening 2111. The first space portion 2141c is in communication with the space under the upper housing 21.

Figure 8:
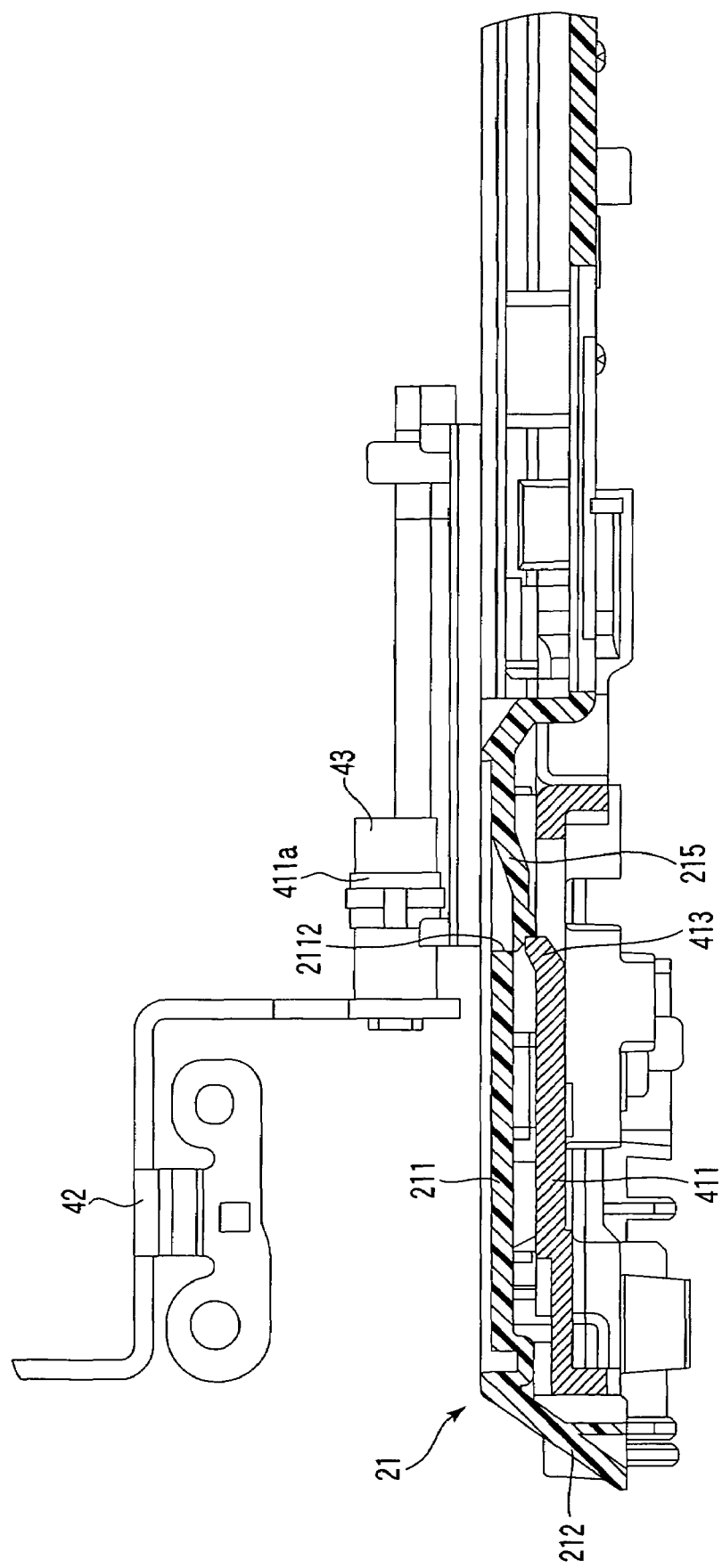
FIG. 8 is an exemplary sectional view of the upper housing to which the hinge is fixed according to the embodiment of the present invention, the view being taken along line F8-F8 in FIG. 3.

As shown in FIG. 8, each of the housing stoppers 215 extends from a right end of the second housing opening 2112 to an obliquely lower left part of the housing upper wall 211. Each of the housing stoppers 215 is integrated with the housing upper wall 211 and is elastic in a vertical direction. Consequently, even if each of the housing stoppers 215 is pressed and deformed upward, it projects downward from the housing upper wall 211 when the pressure is released.

(Configuration of the Hinge 4)

Figure 4:
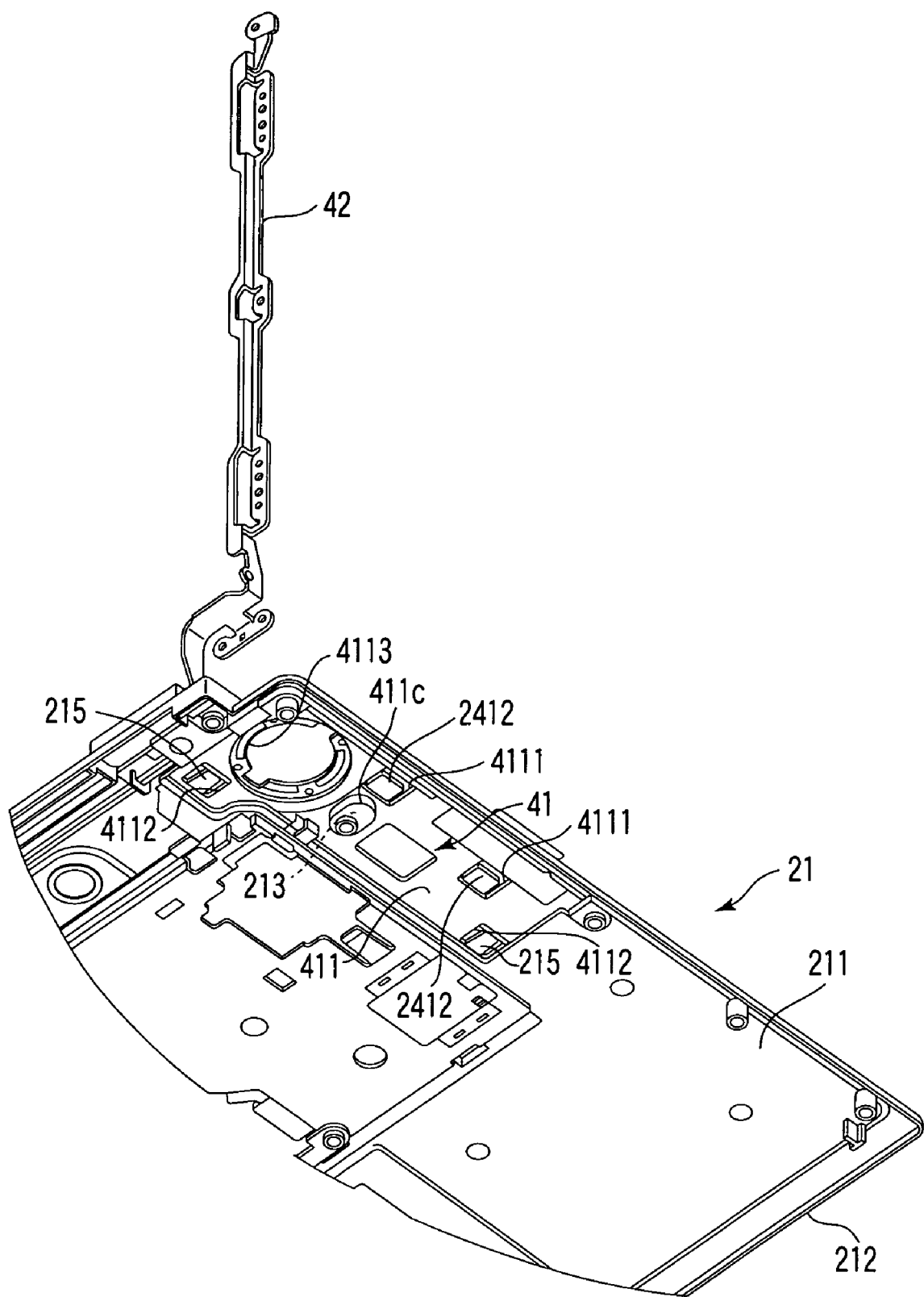
FIG. 4 is an exemplary perspective view of the upper housing to which the hinge is fixed according to the embodiment of the present invention, the upper housing being viewed from below.
Figure 6:
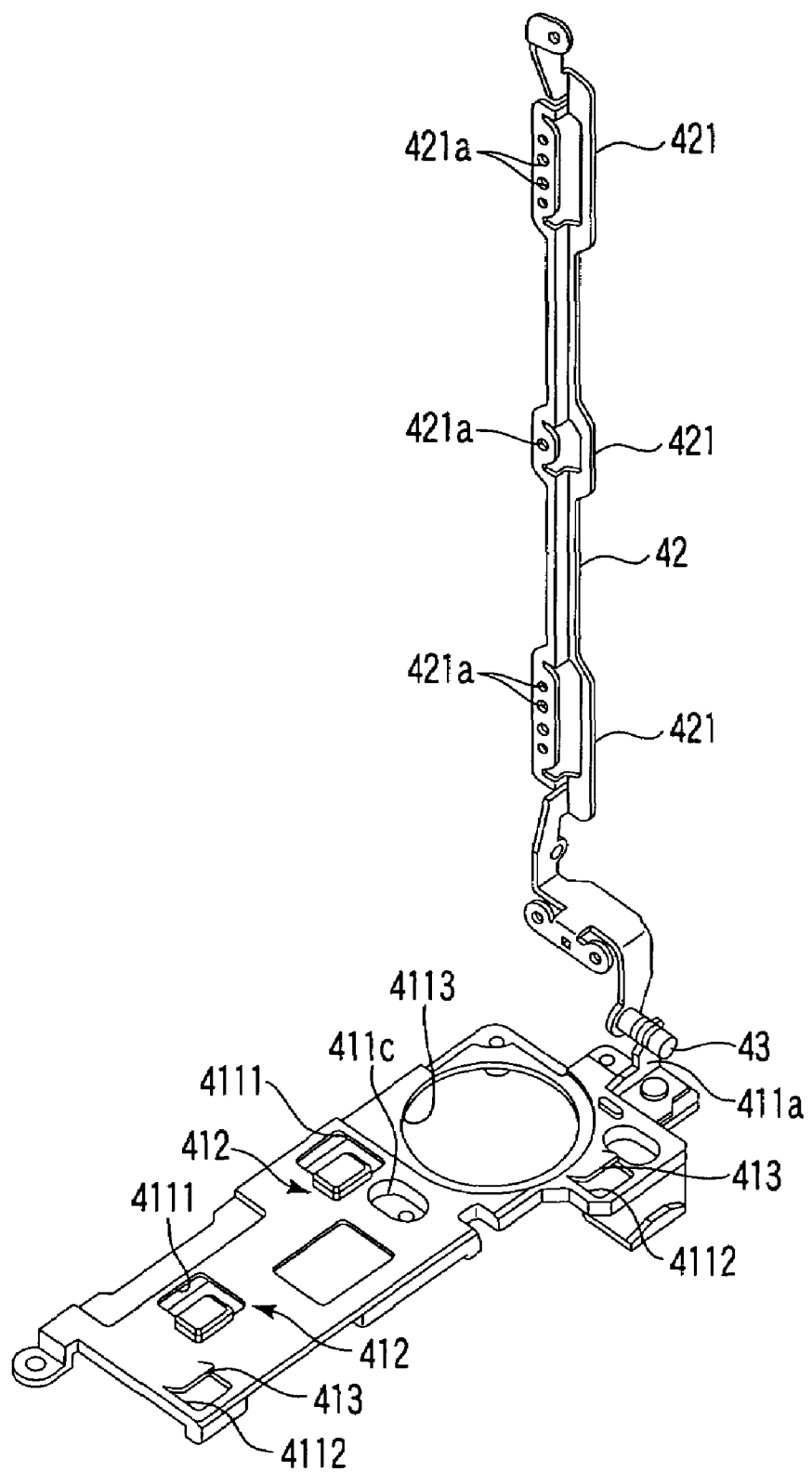
FIG. 6 is an exemplary perspective view of the hinge according to the embodiment of the present invention as viewed from above.

The configuration of the hinge 4 will be described below in detail. FIG. 4 is a perspective view of the upper housing 21 to which the hinge 4 is fixed according to the embodiment of the present invention, the upper housing 21 being viewed from below. FIG. 5 is a bottom view of the upper housing 21 to which the hinge 4 is fixed according to the embodiment of the present invention. FIG. 6 is a perspective view of the hinge 4 according to the embodiment of the present invention as viewed from above.

As shown in FIGS. 4 to 6, the hinge 4 is composed of a first fixing member 41 fixed to the upper housing 21, a second fixing member 42 fixed to the display panel 3, and a connection pin (connection member) 43 that connects the first fixing member 41 to the second fixing member 42.

The first fixing member 41 comprises a base plate (base) 411, two hinge engaging portions (second engaging portion) 412, and two hinge stoppers (second projecting portion) 413.

The base plate 411 is placed parallel to an inner surface of the housing upper wall 211 and has a connection portion 411a connected to the rear. The connection portion 411a has a pin hole extending in the lateral direction. The connection portion 411a may be separate from the base plate 411.

The base plate 411 comprises a circular hinge speaker opening 4113 in the rear. Two through-holes 411c are formed in the base plate 411. The positions of the through-holes 411c correspond to the two bosses 213, formed on the housing upper wall 211.

The base plate 411 comprises two first hinge openings 4111 in front of the hinge speaker opening 4113. The first hinge openings 4111 are disposed at positions corresponding to the two housing engaging portions 214, formed on the upper housing 21.

The base plate 411 comprises two second hinge openings 4112 in front of the hinge speaker opening 4113. The second hinge openings 4112 are disposed at positions corresponding to the two housing stoppers 215, formed in the upper housing 21.

As shown in FIG. 9, the hinge engaging portions 412 are formed at positions corresponding to the two first hinge openings 4111 respectively. Each of the hinge engaging portions 412 is composed of a wall portion 4121 projecting upward from the base plate 411 and an engaging plate 4122 extending from the upper end of the wall portion 4121 and parallel to the base plate 411.

The wall portion 4121 comprises a first wall portion 4121a and a second wall portion 4121b. The first wall portion 4121a is formed on the right of the first hinge opening 4111 and along the front-to-back direction. The second wall portion 4121b is formed in front of the first hinge opening 4111 and along the lateral direction.

The engaging plate 4122 is rectangular and covers a part of the first hinge opening 4111. This forms a second space portion 4121e between the engaging plate 4122 and a plane defined by a plate surface of the base plate 411 which is opposite the housing upper wall 211; the second space portion 4121e corresponds to the height of the wall portion 4121. The second space portion 4121e is open in its sides corresponding to the left and rear of the first hinge opening 4111. The second space portion 4121e is in communication with the space over the base plate 411.

As shown in FIG. 8, the hinge stoppers 413 are connected to a left end 4112a of the second hinge openings 4112 and extend to obliquely upper right parts of the base plate 411. Thus, fixing the first fixing member 41 to the upper housing 21 abuts end surfaces of the housing stoppers 215 against the hinge stoppers 413.

As shown in FIG. 6, the second fixing member 42 comprises slightly wider plate portions 421 in its areas fixed to the display panel 3. Each of the plate portions 421 has a plurality of through-holes 421a formed in a line in a longitudinal direction of the second fixing member 42. Screws used to fix the second fixing member 42 to the display panel 3 are threaded into the display panel 3 through the through-holes 421a.

The connection pin 43 is rotatably inserted into the pin hole formed in the connection portion 411a of the first fixing member 41. The connection pin 43 is also fixed to the second fixing member 42. This allows the second fixing member 42 to be connected to the first fixing member 41 so as to be rotatably using the connection pin 43 as a rotating shaft.

(Mounting of the First Fixing Member 41)

Now, description will be given of an operation of mounting the first fixing member 41 on the upper housing 21.

First, the first fixing member 41 is moved closer to the housing upper wall 211 with the hinge engaging portion 412 located opposite the inner surface of the housing upper wall 211. Upon coming into contact with the housing upper wall 211 or reaching a position a predetermined distance from the housing upper wall 211, the first fixing member 41 is moved leftward along the housing upper wall 211 while maintaining the distance to the housing upper wall 211. On this occasion, even if the first fixing member 41 comes into contact with the housing stoppers 215, it continues to be moved leftward. This causes the housing stoppers 215 to be pushed up by the first fixing member 41 and to slide along the top surface of the first fixing member 41.

Figure 7:
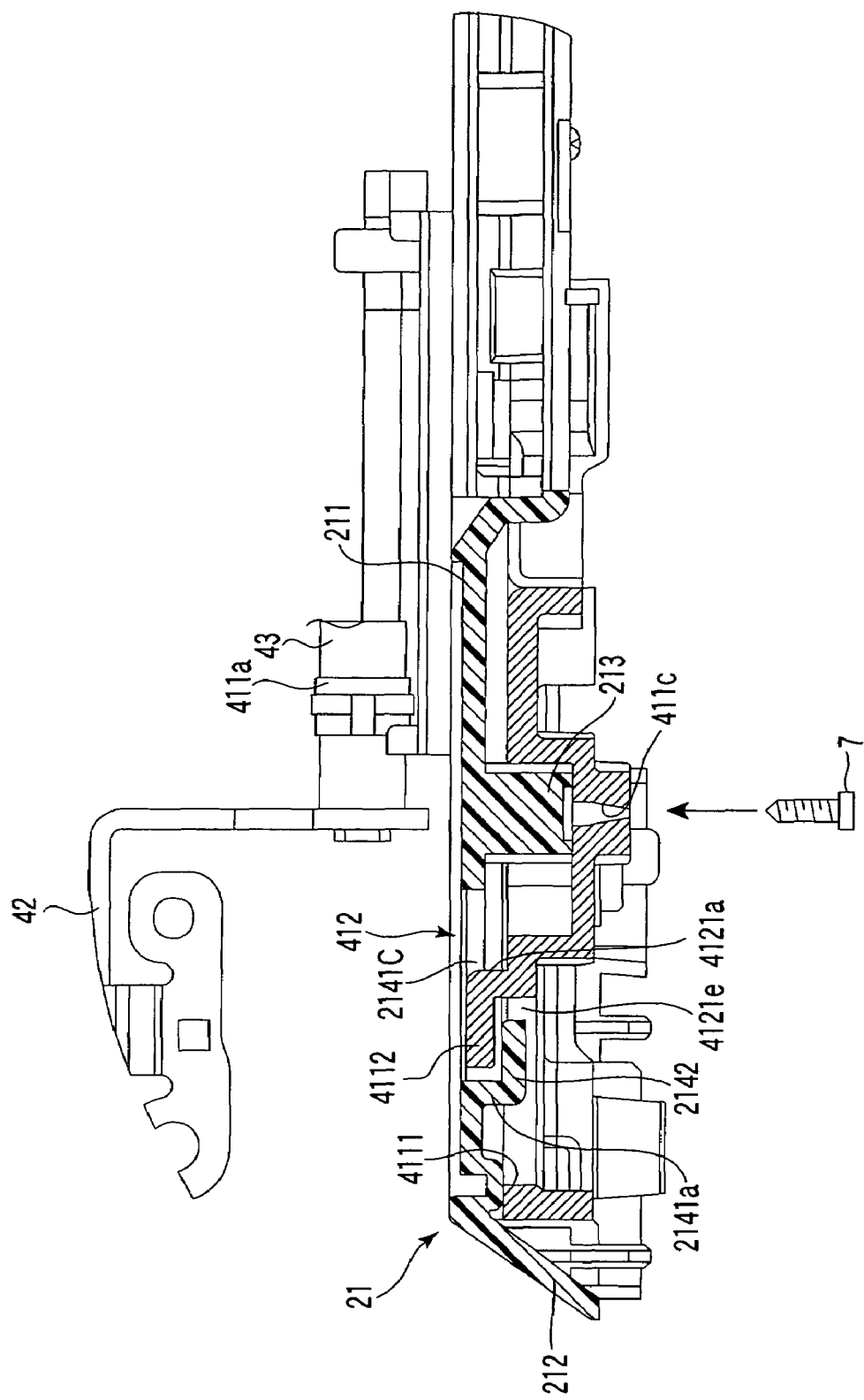
FIG. 7 is an exemplary sectional view of the upper housing to which the hinge is fixed according to the embodiment of the present invention, the view being taken along line F7-F7 in FIG. 3.

The first fixing member 41 is further moved leftward. Then, as shown in FIG. 7, the engaging plates 4122 of the hinge engaging portions 412 advance into the first space portions 2141c, whereas the engaging plates 2142 of the housing engaging portions 214 advance into the second space portions 4121e. The engaging plates 2142 of the housing engaging portions 214 thus engage with the engaging plates 4122 of the hinge engaging portions 412. This regulates the vertical movement of the first fixing member 41 with respect to the housing upper wall 211.

The housing stoppers 215, formed in the housing upper wall 211, are located so as to reach the second housing openings 2112, formed in the base plate 411 of the first fixing member 41, when the engaging plates 2142 of the housing engaging portions 214 engage with the engaging plates 4122 of the hinge engaging portions 412.

Consequently, when the housing stoppers 215 reach the second housing openings 2112, the housing stoppers 215 already pushed up by the base plate 411 of the first fixing member 41 project downward owing to their own elasticity. This places the tips of the housing stoppers 215 opposite tips of the hinge stoppers 413, formed on the first fixing member 41, to regulate the rightward movement of the first fixing member 41, as shown in FIG. 8.

At the same time, the through-holes 411c, formed in the base plate 411 of the first fixing member 41, lie opposite the bosses 213, formed on the housing upper wall 211. In other words, when the housing engaging portions 214 engage with the hinge engaging portions 412 and the housing stoppers 215 engage with the hinge stoppers 413, the first fixing member 41 cannot move in any directions with respect to the upper housing 21. This is a "temporarily fixed state".

When the first fixing member 41 is thus temporarily fixed to the upper housing 21, the self-tapping screws 7 are threaded from the inside of the housing 20 into the bosses 213 through the through-holes 411c. This rigidly fixes the first fixing member 41 to the upper housing 21. Thus, the temporary fixation prevents the first fixing member 41 from moving with respect to the upper housing 21. This improves the operating efficiency of the screwing.

EFFECTS OF THE PRESENT EMBODIMENT

In the electronic apparatus 1 configured as described above, the first fixing member 41 is temporarily fixed to the upper housing 21 by engaging the housing engaging portions 214, disposed in the housing upper wall 211, with the hinge engaging portions 412, disposed in the base plate 411. This simplifies the operation of screwing the first fixing member 41 to the upper housing 21 to improve the operating efficiency of assembly of the electronic apparatus 1.

Simply moving the first fixing member 41 along the inner surface of the housing upper wall 211 of the upper housing 21 advances the engaging plates 2142 of the housing engaging portions 214 into the second space portions 4121e, while advancing the engaging plates 4122 of the hinge engaging portions 412 into the first space portions 2141c. This allows the first fixing member 41 to be temporarily fixed very easily.

In the electronic apparatus 1 according to the present embodiment, the temporary fixation of the upper housing 21 and first fixing member 41 engages the housing stoppers 215 of the upper housing 21 with the hinge stoppers 413 of the first fixing member 41. This prevents the first fixing member 41 from falling off. Thus, the temporary fixation is very stably maintained until the first fixing member 41 is screwed to the upper housing 21. This prevents the self-tapping screws 7 from being threaded into incorrect positions.

In the electronic apparatus 1 according to the present embodiment, the housing engaging portions 214 and the hinge engaging portions 412 are disposed at different positions in both the front-to-back and lateral directions. In other words, the first fixing member 41 engage with the upper housing 21 at two different positions in both the front-to-back and lateral directions. Even when the first fixing member 41 is temporarily fixed to the upper housing 21, the first fixing member 41 does not substantially shake with respect to the upper housing 21. This also enables the self-tapping screws 7 to be threaded into the correct positions.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications ad would fall within the scope and spirit of the inventions.

What is claimed is:

1. An electronic apparatus comprising:
    a main body including a housing having a main wall and a first engaging portion placed inside the housing, a space portion being created between the first engaging portion and a plane defined by an inner surface of the main wall; and
    a display panel connected to the main body by at least one hinge including a first fixing member fixed to the housing, a second fixing member fixed to the display panel, and a connection member which rotatably connects the second fixing member to the first fixing member, the first fixing member having a base located opposite the main wall with respect to the first engaging portion and a second engaging portion which is to be inserted into the space portion to engage with the first engaging portion.

2. The electronic apparatus according to claim 1, further comprising:
a regulating portion which prevents the second engaging portion completely inserted into the space portion from leaving the space portion.

3. The electronic apparatus according to claim 1, wherein the first fixing member is screwed to the housing.

4. The electronic apparatus according to claim 1, wherein the hinges are placed at respective widthwise ends of the display panel.

5. The electronic apparatus according to claim 2, wherein the regulating portion is a projecting portion which projects from an inner surface of the housing to engage with the base.

6. The electronic apparatus according to claim 5, wherein the projecting portion is elastic in a direction crossing the inner surface of the main wall.

* * * * *